United States Patent
Condie et al.

(10) Patent No.: US 10,113,767 B1
(45) Date of Patent: Oct. 30, 2018

(54) AIR HANDLING UNIT

(71) Applicant: Berg Companies, Inc., Spokane, WA (US)

(72) Inventors: Brent Condie, Worley, ID (US); Travis Tully, Spokane, WA (US)

(73) Assignee: Berg Companies, Inc., Spokane, WA (US)

( * ) Notice: Subject to any disclaimer, the term of this patent is extended or adjusted under 35 U.S.C. 154(b) by 0 days.

(21) Appl. No.: 15/886,743

(22) Filed: Feb. 1, 2018

(51) Int. Cl.
- *F24F 12/00* (2006.01)
- *E04B 1/343* (2006.01)
- *F24F 1/00* (2011.01)
- *E04H 1/12* (2006.01)

(52) U.S. Cl.
CPC ........ *F24F 12/006* (2013.01); *E04B 1/34336* (2013.01); *E04H 2001/1283* (2013.01); *F24F 2001/0048* (2013.01); *F24F 2001/0051* (2013.01); *F24F 2001/0055* (2013.01)

(58) Field of Classification Search
CPC .................. F24F 12/002; F24F 12/006; F24F 2001/0051; F24F 2001/0048; F24F 2001/0055; E04B 1/34336; E04H 2001/1283
See application file for complete search history.

(56) References Cited

U.S. PATENT DOCUMENTS

| | | | | |
|---|---|---|---|---|
| 611,359 A * | 9/1898 | Dickson | ................ | F24F 12/006 237/46 |
| 2,899,178 A * | 8/1959 | Dubin | ................... | B21D 53/08 165/182 |
| 3,867,981 A * | 2/1975 | Monroe | ................... | F28D 1/053 165/128 |
| 4,413,674 A * | 11/1983 | Avery | .................... | H01F 27/12 165/104.33 |
| 7,152,670 B2 * | 12/2006 | Dobbs | .................... | F24F 3/147 165/166 |
| 7,701,714 B2 * | 4/2010 | Shabany | ............ | H05K 7/20781 165/104.33 |
| 7,934,543 B2 * | 5/2011 | Fieback | ................ | C08J 9/0009 165/10 |
| 8,650,806 B1 * | 2/2014 | Condie | ................ | E04H 1/1205 52/79.5 |
| 9,062,890 B2 * | 6/2015 | Benoit | .................. | F24F 12/006 |
| 9,121,617 B2 * | 9/2015 | Condie | ..................... | F24F 1/02 |
| 9,273,907 B2 * | 3/2016 | Dinulescu | ............ | F28D 9/0037 |
| 9,347,675 B2 * | 5/2016 | Breshears | ............ | F24F 12/006 |
| 9,388,601 B2 * | 7/2016 | Reinking | ............... | E04H 15/14 |

(Continued)

*Primary Examiner* — Rodney Mintz

(74) *Attorney, Agent, or Firm* — Lee & Hayes, PLLC

(57) ABSTRACT

A wall mounted heat exchanger including a plurality of panels. Individual panels may include a first end, a second end, a first sidewall, a second sidewall, a first gap disposed along the second end, and a second gap disposed along the second sidewall. A first plurality of panels may be arranged such that first ends of the first plurality of panels are co-planar with second ends of a second plurality of panels and first sidewalls of the first plurality of panels are co-planar with second sidewalls of the second plurality of panels. The first plurality of panels and the second plurality of panels, when arranged, may form a plurality of first inlets from the second gap, a plurality of first outlets from the first gap, a plurality of second inlets from the second gap, and a plurality of second outlets from the first gap.

20 Claims, 11 Drawing Sheets

(56) References Cited

U.S. PATENT DOCUMENTS

| | | | |
|---|---|---|---|
| 9,429,341 B2* | 8/2016 | Condie | F24F 1/02 |
| 2005/0034390 A1* | 2/2005 | Dubensky | E04B 1/3483 52/220.1 |
| 2005/0084324 A1* | 4/2005 | Dubensky | E04B 1/3483 403/305 |
| 2010/0006274 A1* | 1/2010 | Cho | F28D 9/0037 165/166 |
| 2010/0243228 A1* | 9/2010 | Price | F23J 15/06 165/185 |
| 2011/0017436 A1* | 1/2011 | Cho | F28D 9/0037 165/166 |
| 2011/0146941 A1* | 6/2011 | Benoit | F24F 12/006 165/11.1 |
| 2012/0012290 A1* | 1/2012 | Breshears | F24F 3/147 165/164 |
| 2012/0129442 A1* | 5/2012 | Wei | H05K 7/1497 454/184 |
| 2013/0020049 A1* | 1/2013 | Breshears | F24F 3/147 165/53 |
| 2013/0126123 A1* | 5/2013 | Breshears | F24F 3/147 165/54 |
| 2013/0186010 A1* | 7/2013 | Condie | F24F 1/02 52/79.5 |
| 2013/0247509 A1* | 9/2013 | Pike | E04H 1/1205 52/764 |
| 2013/0312929 A1* | 11/2013 | Breshears | F24F 3/147 165/56 |
| 2014/0034268 A1* | 2/2014 | Breshears | F24F 3/147 165/56 |
| 2015/0034283 A1* | 2/2015 | Breshears | F24F 3/147 165/154 |
| 2015/0053381 A1* | 2/2015 | Takada | F28F 3/048 165/166 |
| 2015/0075758 A1* | 3/2015 | Ishimaru | F28F 3/048 165/167 |
| 2015/0107809 A1* | 4/2015 | Dinulescu | F28D 9/0037 165/166 |
| 2015/0184946 A1* | 7/2015 | Barwig | F02M 26/32 123/542 |
| 2015/0369520 A1* | 12/2015 | Condie | F24F 1/02 165/45 |
| 2016/0131373 A1* | 5/2016 | Breshears | F24F 3/147 165/56 |
| 2016/0258637 A1* | 9/2016 | Breshears | F24F 3/147 |
| 2016/0298871 A1* | 10/2016 | Gillatt | E04B 1/8218 |
| 2016/0333586 A1* | 11/2016 | King | E04D 13/031 |

* cited by examiner

AIR HANDLING UNIT

BACKGROUND

Portable shelters have been developed for transportation to remote sites where they are then set-up for use. For instance, among other applications, portable shelters may be used as barracks, field hospitals, mess halls, kitchens, relief shelters, communication centers, or laboratories. When deployed, in some instances, walls of the portable shelter may extend to create a significantly larger operating footprint than when the portable shelter is transported.

To accommodate for their range of different environments and purposes, portable shelters may have air-conditioners, heaters, or other air handling units (AHUs). However, these units are not easily integrated into portable shelters and often consume large amounts of space. Given the compact nature of portable shelters, these units can therefore detract from their utility.

In addition, depending on the application of the portable shelter or per certain regulations and/or requirements, the interior air within the portable shelter may need to be cycled or exchanged with outside air. However, exchanging interior air with outside air causes heat transfer between the interior and exterior of the portable shelter. Such heat transfer between the interior and exterior of the portable shelter is undesirable because it impairs the ability of the heater or air conditioner to control the temperature of the portable shelter. This results in a need for larger capacity heaters, air conditioners, or environmental control units (ECUs), which translates to higher energy demands required by the shelter. Also, in the military context, such heat transfer between the interior and exterior of the portable shelter is undesirable because it may make the portable shelter detectible by thermal imaging.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
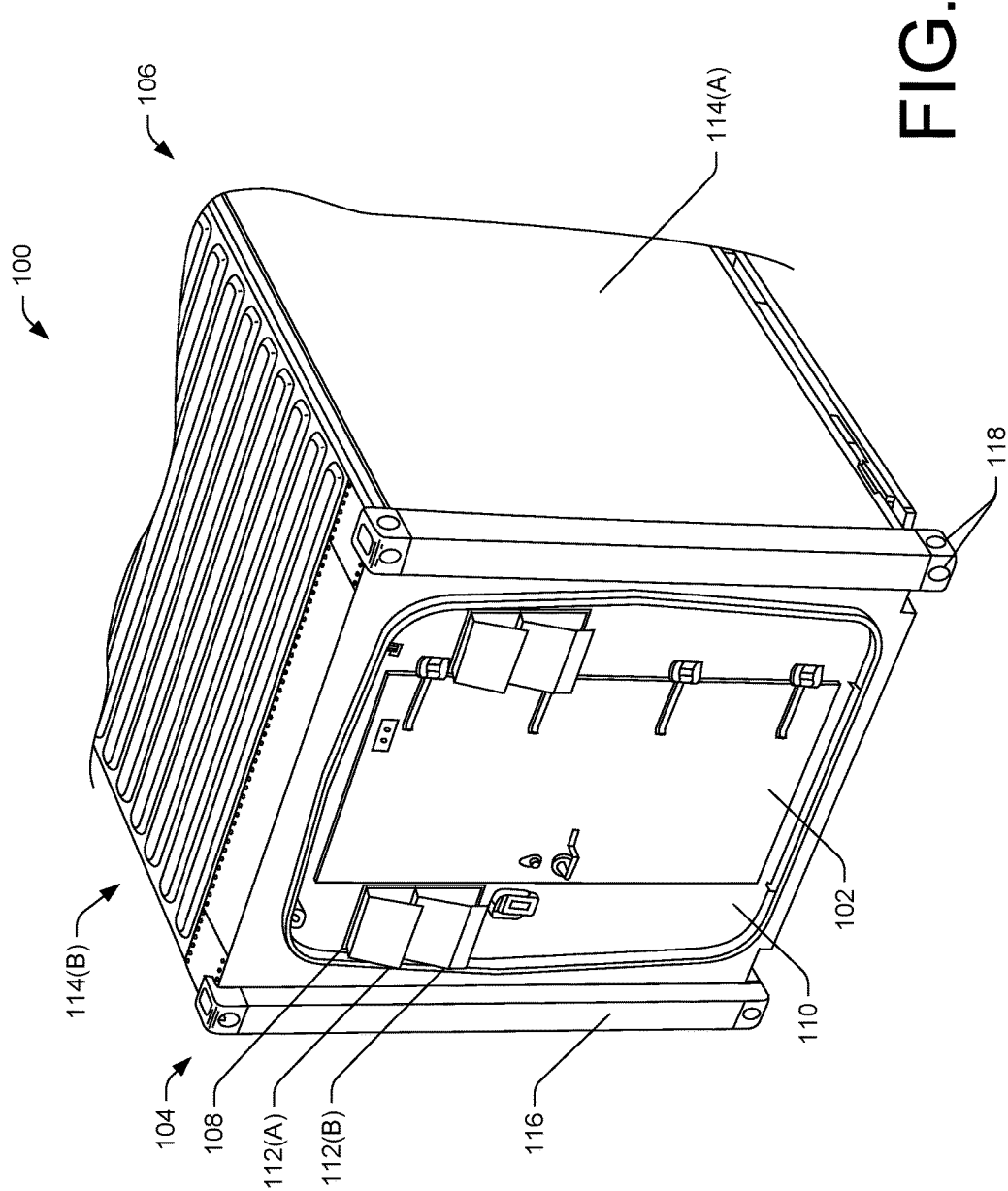
FIG. 1 is a perspective view of an exterior of an example portable shelter in which an example air handling unit is installed.

As mentioned above, existing portable shelters, or other portable shelters, may include heaters and/or air conditioners to regulate temperature within the portable shelters. Additionally, air within the portable shelters (i.e., interior air) may need to be cycled or exchanged with outside air. However, if there is a temperature differential between the interior air and the outside air, exchanging the interior air with outside air causes heat transfer between the interior and exterior of the of the portable shelter. A heat exchanger may be used to minimize heat transfer between the interior and exterior of the shelter. However, heat exchangers or air handling units are primarily designed for buildings and often require large amounts of ductwork. As such, conventional heat exchangers or air handling units are not practical for use in portable shelters because their size significantly reduces the operational space within the portable shelter. While the size of the heat exchanger may be reduced, for instance, doing so reduces efficiency and/or heat transfer capacity of the heat exchanger.

Consequently, existing portable shelters have not effectively integrated air handling units without sacrificing an operational space of the portable shelter or an efficiency of the air handling unit. For instance, an air handling unit having an efficient heat exchanger that captures and transfers heat from exhausted interior air (i.e., outgoing air) to incoming outside ambient air (i.e., incoming air) may be large in size, reduce an interior space of the portable shelter, or increase an exterior footprint of the portable shelter.

On the other hand, limiting the size of the heat exchanger within the air handling unit may reduce its effects on the operational space but may sacrifice an efficiency of the heat exchanger, thereby limiting its heat transfer ability (e.g., the rate at which the heat exchanger can transfer heat between the interior and exterior air) and/or requiring increased energy consumption to heat and/or cool the interior space. Due to the remoteness and harshness of some environments in which portable shelters may be deployed, its often desirable to minimize the amount of power consumed by the portable shelter.

In light of the shortcomings of existing portable shelters, this application describes compact air handling units that may be used with portable shelters. In some instances, the air handling unit may have a minimal impact on the operational space of the portable shelter while at the same time efficiently transferring heat between outgoing interior air and incoming exterior air. That is, the air handling unit may serve to heat or cool the incoming air through exchanging heat with outgoing air from within the portable shelter. In doing so, less power may be demanded to condition the interior space of the portable shelter.

In some instances, the air handling unit may include fans, a heat exchanger, and a cover. The fans may be arranged or oriented to exhaust interior air and draw exterior air through the heat exchanger. For instance, a first fan (or fans) may draw incoming air (e.g., pulling or pushing the ambient air) towards the interior of the portable shelter while a second fan (or fans) may draw outgoing air (e.g., pulling or pushing the interior air) towards the exterior of the portable shelter. Therefore, the fans may create separate air flows or streams through the heat exchanger in opposite directions. That is, a first flow may represent an incoming air flow, from the exterior toward the interior of the portable shelter, while a second flow may represent an outgoing air flow, from the interior toward the exterior of the portable shelter.

In some instances, the fans may draw the respective air flows through the heat exchanger to condition the incoming air before reaching the interior space of the portable shelter. As such, heat may be exchanged between the outgoing air flow and the incoming air flow within the heat exchanger in order to cool or warm the incoming air exhausted into the interior space of the portable shelter. Within the heat exchanger, between where the incoming air enters the heat exchanger and the outgoing air exits the heat exchanger, the incoming air may exchange heat with the outgoing air, vice versa.

Within the heat exchanger, the incoming air flow and the outgoing air flow may be designed to exchange heat between panels, plates, or dividers interposed between the incoming air flow and the outgoing air flow. For instance, in some examples, the incoming air may be warmer than the outgoing air, such as in a desert environment, and the interior of the portable shelter may need to be kept at cooler temperatures. However, simply exhausting the outgoing air without capturing otherwise lost energy may require continuously cooling the interior of the portable shelter (e.g., via an air-conditioner), thereby requiring more energy for the air conditioner to cool the interior of the portable shelter. By exchanging heat with outgoing air, the incoming air may be cooled prior to being exhausted into the portable shelter.

Conversely, in a cold environment, heat may be transferred from the outgoing air to the incoming air to maintain a warm environment within the interior of the portable shelter. As such, the power consumption of a heater or other heating ventilation and air conditioning (HVAC) equipment used to heat and/or cool the interior of the portable shelter may be reduced.

In some instances, the heat exchanger may include a plurality of first inlets for receiving the incoming air and a plurality of first outlets for exhausting the incoming air into the interior of the portable shelter. The heat exchanger may also include a plurality of second inlets for receiving the outgoing air and a plurality of second outlets for exhausting the outgoing air. In some instances, the plurality of first inlets may be coplanar or aligned with one another, the plurality of first outlets may be coplanar or aligned with one another, the plurality of second inlets may be coplanar or aligned with one another, and the plurality of second outlets may be coplanar or aligned with one another. In addition, in some instances, the plurality of first inlets may be parallel or perpendicular to the plurality of second inlets and the plurality of first outlets may be parallel or perpendicular with the plurality of second outlets.

Interposed between the plurality of first inlets and the plurality of first outlets may be a plurality of first channels configured to route or direct the incoming air towards the interior of the portable shelter. Similarly, interposed between the plurality of second inlets and the plurality of second outlets may be a plurality of second channels that route or direct the outgoing air towards the exterior of the portable shelter. In some instances, the plurality of first channels and the plurality of second channels may be alternatively positioned or stacked to form the heat exchanger of the air handling unit.

The plurality of first inlets may be disposed adjacent to an opening in the portable shelter to receive incoming air drawn by a fan(s). To exhaust the outgoing air, the plurality of second outlets may also be disposed adjacent to an opening in the portable shelter. In some instances, the opening in the portable shelter through which the incoming air enters the plurality of first inlets may be adjacent to or displaced from the opening in the portable shelter where the outgoing air exits the plurality of second outlets. As such, the plurality of first inlets may draw incoming air at a location distant to where the outgoing air exits the plurality of second outlets. In some instances, this may prevent outgoing air from immediately being drawn back into the portable shelter.

In some instances, a shroud or other vent may be included that directs the outgoing air away from a location at which the incoming air is drawn into the air handling unit and/or the heat exchanger. Additionally or alternatively, other ductwork or conduit may be included that permits the incoming air to be drawn at a location distant from the outgoing air.

As alluded to previously, interposed or separating the plurality of first channels and the plurality of second channels may be panels, plates, or other dividers. These dividers may separate the incoming air flow and the outgoing air flow from one another. The dividers may be made of metal (e.g., aluminum, magnesium, steel, stainless steel, etc.) or other material having a relatively high thermal conductivity. Heat may be transferred between the incoming air flow and the outgoing air flow, for instance, through the dividers interposed between the respective flows.

In some instances, the heat exchanger of the air handling unit may be created or formed by alternatingly stacking dividers that include the plurality of first channels and the plurality of second channels. In some instances, the plurality of first channels may be included in dividers that are disposed in a first direction while the plurality of second channels may be included in dividers that are disposed in a second direction. In some instances, a universal divider may be used to form the plurality of first channels and the plurality of second channels, but through changing an orientation of the divider (e.g., by rotating the divider 180 degrees), the dividers may couple together in an alternating, stacked relationship to form the heat exchanger. Stated another way, a first subset of the dividers may be arranged in a first direction, while a second subset of the dividers may be rotated 180 degrees be arranged in a second direction.

Depending on the application, the heat exchanger may have any number of alternatingly stacked plurality of first dividers and plurality of second dividers to form any number of inlets and outlets. In some instances, the number of alternatingly stacked plurality of first dividers and plurality of second dividers may be based in part on a length of the heat exchanger, dimensions of the cover, or manufacturing limitations. In other instances, the number of dividers used may depend on other size constraints and/or heat transfer requirements. Moreover, in some instances, the width of the heat exchanger, as represented by the number of alternatingly stacked plurality of first dividers and plurality of second dividers, may be a percentage or fraction of the length of the heat exchanger. For instance, the width of the heat exchanger may be between 40% and 100% of the length of the heat exchanger. In some instances, the width of the heat exchanger may limit the flow rate while the length may limit an efficiency of the heat exchanger. Having the width between 40% and 100% of the length may therefore balance flow and efficiency considerations. By way of non-limiting examples, in some instances, the heat exchanger may include between 5-10 alternatingly stacked panels, 10-20 alternatingly stacked panels, 20-30 alternatingly stacked panels, 30-40 alternatingly stacked panels, or 40-50 alternatingly stacked panels. Accordingly, a size or amount of channels included in the heat exchanger may be increased through adding dividers of the plurality of first dividers and/or the plurality of second dividers.

To increase the surface area of the plurality of first channels and the plurality of second channels, the top surface and/or the bottom surface of the dividers may be wavy, bumpy, dimpled, zig-zagged, finned, or include other protrusions and/or indentations. In doing so, a rate of heat transfer, via the increased surface area, may be increased. However, when included, the protrusions and/or indentations may be selectively applied to not materially impede or adversely affect the incoming air flow and/or the outgoing air flow through the heat exchanger (i.e., turbulence).

In some instances, the heat exchanger may be a parallel-flow heat exchanger, a cross-flow heat exchanger, a counter-flow heat exchanger, or any combination thereof. In addition, the heat exchanger may be a shell and tube heat exchanger, a plate heat exchanger, or a plate and fin heat exchanger.

The heat exchanger may be configured for various air flow rates and efficiencies. For instance, the rate of incoming air flow and/or outgoing air flow may be controlled by the speed of a controller coupled to fans that draw the incoming air and the outgoing air, respectively. In some instances, the heat exchanger may be designed to operate up to or greater than 130 cubic feet per minute (cfm) and as low as 65 cfm. Depending on the flow rates or the temperature difference between the interior and exterior of the portable shelter, the heat exchanger may have efficiencies between 45% and 65%. For instance, lowering the flow rates of the incoming air flow and the outgoing air flow may increase the efficiency of the heat exchanger. However, while these ranges or values have been given, these are just examples and in other instances air handling units according to this application can be sized to handle airflows smaller or larger than this range and have efficiencies greater than those mentioned.

Moreover, prolonged exchange conditions between the incoming air and the outgoing air may create a heat load within the heat exchanger that degrades intake efficiency slightly and inversely increases exhaust air exchange efficiency. Such effects may be controlled or mitigated through air flow rates, a length and/or width of the dividers included in the heat exchanger, a length of the channels, or a speed of the fan(s).

The heat exchanger may reside within a cover of the air handling unit. In some instances, the cover may be disposed within the interior of the portable shelter to prevent increasing an exterior footprint of the portable shelter. However, in some instances, the air-handling unit may be coupled to the exterior of the portable shelter within a mechanical compartment, for instance. In some instances, the cover may be disposed on a front of the portable shelter, on either or both sides of a door that provides access to the portable shelter. However, the air handling unit may be located at other locations on the portable shelter.

Whether coupled to the interior, exterior, or both, portions of the air handling unit may be disposed through the wall of the portable shelter. For instance, the fans of the air handling unit may be disposed within or reside within a wall of the portable shelter.

The cover may include openings that permit the outgoing air to enter and exit the heat exchanger and openings through which the incoming air is permitted to enter and exit the heat exchanger. In addition, the cover may assist in routing or otherwise channeling the outgoing air towards the exterior of the portable shelter and/or routing or otherwise channeling the incoming air towards the interior of the portable shelter.

As mentioned above, the air handling unit may include fans that draw the incoming air and the outgoing air into and through the heat exchanger. In some instances, components of the fans, such as motors, switches, power or control units, may also be disposed within the cover. Filters may also be included within the cover or otherwise coupled to the portable shelter. As such, upon assembly, the air handling unit may resemble a sleek and compact enclosure that easily couples to the portable shelter.

While the heat exchanger has been described above as including alternatingly stacked dividers, other designs of heat exchangers may be included within the air handling unit.

FIG. 1 illustrates a partial perspective view of a portable shelter 100. While FIG. 1 and subsequent figures illustrate the portable shelter 100, the portable shelter 100 is just one example of a portable shelter according to the embodiments of this application. For instance, portable shelters may include expandable shelters (e.g., shelters having one or more expandable sides) as well as non-expandable shelters. In the case of expandable shelters, the expandable portions may be hard sided (e.g., rigid walled), soft sided (e.g., flexible walled), or a combination of hard and soft sides/walls.

In some instances, the portable shelter 100 may have a door 102 located at a front end 104, opposite a back end 106, of the portable shelter 100. The door 102 may provide access to an interior of the portable shelter 100.

Disposed on either or both sides of the door 102 may be shrouds 108. In some instances, the shrouds 108 may be coupled to an exterior surface 110 of the portable shelter 100 and may be disposed or aligned over openings in the portable shelter 100. The shrouds 108 may include flanges, rims, brims, ports, or spouts 112(A) and 112(B) that project from the shrouds 108 (collectively, "the flanges 112"). The shrouds 108 and/or flanges 112 may have low profiles to not increase a footprint of the portable shelter 100.

In some instances, the flanges 112 may be oriented in different directions. Discussed in more detail, the shrouds 108 may be arranged and configured to vent outgoing air from within the interior of the portable shelter 100 and intake incoming air that is exterior to the portable shelter 100.

Sides 114(A) and 114(B) may extend between the front end 104 and the back end 106 of the portable shelter 100.

In some instances, the portable shelter 100 may be at least partially constructed from a standard shipping container (e.g., intermodal freight container) formed of metal (e.g., steel). For instance, the portable shelter 100 may be a standard shipping container modified to include the door 102, the sides 114(A) and 114(B), electrical components, plumbing, insulation, etc. In addition, given that the portable shelter 100 may be constructed from a standard shipping container, the portable shelter 100 may have dimensions similar to that of a standard shipping container.

In some instances, the sides 114(A) and 114(B) may be displaceable in order to expand the portable shelter 100 from a storage, stowed, shipping, retracted state or position to a deployed, use, extended state or position. During a stowed state, the sides 114(A) and 114(B) may include a plurality of panels that may be folded into a frame 116 of the portable shelter 100, within the footprint of the standard shipping container, and unfolded during deployment. For instance, in some instances, the sides 114(A) and 114(B) may include a movable portion having an insulated ceiling panel that may fold up (e.g., with the assistance of a fluid actuated cylinder) to a position coplanar with a top of the portable shelter 100. Two side wall panels may fold out and become coplanar or substantially coplanar with the ends (e.g., the front end 104 and the back end 106, respectively) of the portable shelter 100. In some instances, the two side wall panels, in the deployed state, may act as trusses to support the ceiling panel, providing structural support while enlarging the interior footprint or area of the portable shelter 100.

A floor panel may be included in the sides 114(A) and 114(B) which folds down to a position coplanar with the bottom of the portable shelter 100. In some instances, a winch and cable system may be employed to ease the lowering of the floor panel. A back wall panel may also be included that folds up from the floor panel, pivoting on the floor panel outer edge to which the back wall panel bottom edge is coupled. Once fully deployed, the back wall panel may provide truss support similar to that of the side wall panels discussed above.

By utilizing a hard-sided panel system for the sides 114(A) and 114(B), the portable shelter 100 may be deployed quickly and with considerable strength and insulating properties. The panels of the sides 114(A) and 114(B) may include structurally insulated panels (SIPs) which, in some instances, may include at least a layer of insulation material sandwiched between two thin outer skins made of structural materials.

Consistent with ISO and/or other standards, the portable shelter 100 may also include structural features such as slots 118 or other openings that enable the frame 116 of the portable shelter 100 to be readily transported by forklift, crane, or helicopter, for instance.

Figure 2:
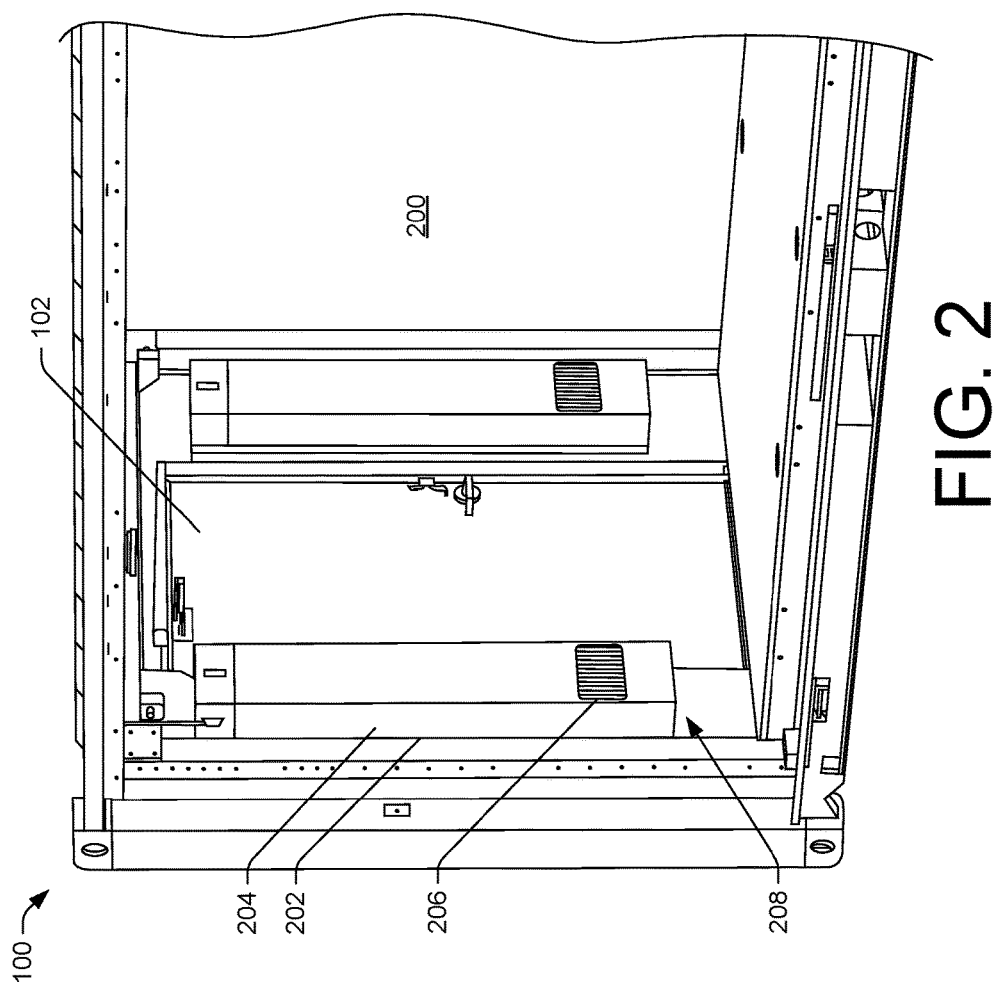
FIG. 2 is a perspective view of an interior of the example portable shelter of FIG. 1, showing the example air handling unit disposed on either side of a door of the portable shelter.

FIG. 2 illustrates an interior 200 of the portable shelter 100, showing an air handling unit 202 disposed on either side of the door 102. In FIG. 2, the sides 114(A) and 114(B) are shown as being translucent to illustrate the interior 200 of the portable shelter 100. In conjunction with FIG. 1, the air handling unit 202 may be arranged and configured to receive incoming air and route the incoming air into the interior 200 of the portable shelter 100. In addition, the air handling unit 202 may be configured to draw outgoing air and route the outgoing air towards the exterior of the portable shelter 100. In some instances, the air handling unit 202 may draw incoming air and exhaust outgoing air through and via the shrouds 108.

The air handling unit 202 may include a cover 204 that encases or surrounds parts of the air handing unit 202. For instance, beneath the cover 204, the air handling unit 202 may include a heat exchanger. Discussed in more detail herein, the heat exchanger may exchange heat between incoming air and outgoing air to condition the incoming air prior to reaching the interior 200 of the portable shelter 100. To create the respective flows, fans may be included.

In some instances, the cover 204 may include an opening 206 that aligns or is disposed over outlets of the heat exchanger. In some instances, the opening 206 may represent an outlet where incoming air exhausts into the interior 200 of the portable shelter 100. That is, after passing through the heat exchanger, the incoming air may exit into the interior 200 via the opening 206.

The cover 204 may also include an opening 208 where outgoing air is drawn into the air handling unit 202 (pointing to an underneath side of the cover 204 of the air handling unit 202). After passing through the heat exchanger, the outgoing air may be exhausted exterior to the portable shelter 100. In some instances, to allow the incoming air to circulate and disperse throughout the interior 200, the second opening 208 may be disposed away from or located distant from the opening 206.

Figure 3:
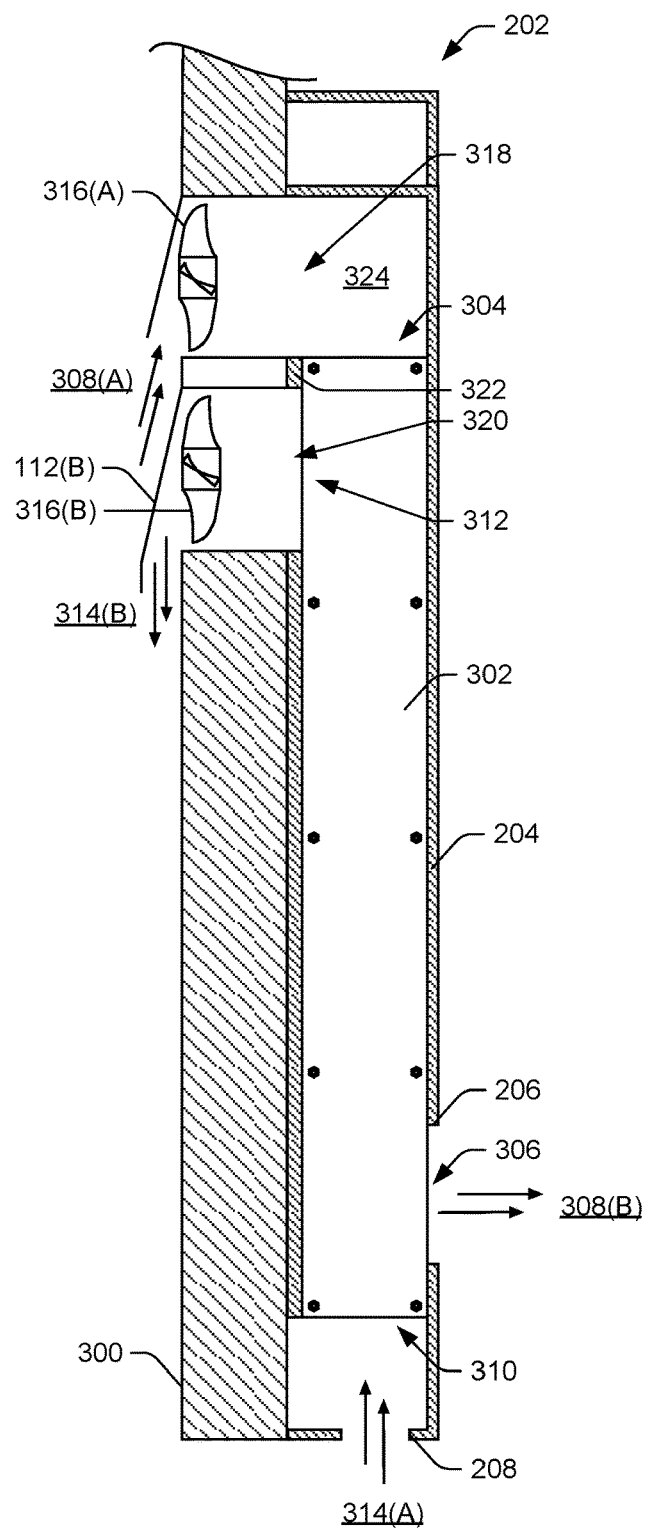
FIG. 3 is a cross-sectional view of the example portable shelter of FIG. 1, showing the example air handling unit of FIG. 2 coupled and disposed through a wall of the portable shelter.

FIG. 3 depicts the air handling unit 202 coupled to a wall 300 of the portable shelter 100. In FIG. 3, the wall 300 is shown as being cross-sectioned to illustrate the disposition of the air handling unit 202 on the portable shelter 100. In addition, a portion of the cover 204 is shown as being cross-sectioned to illustrate a heat exchanger 302 residing within the cover 204 of the air handling unit 202.

The heat exchanger 302 may include a plurality of first inlets 304 disposed at or along a top of the heat exchanger 302. In some instances, the plurality of first inlets 304 may be configured to receive incoming air. The incoming air may pass through the heat exchanger 302 and exit or be exhausted into the interior 200 of the portable shelter 100 via a plurality of first outlets 306. The flow of the incoming air through the air handling unit 202, and the heat exchanger 302, may be represented by arrows 308(A), which shows the incoming air entering the air handling unit 202, and arrows 308(B), which shows the incoming air exiting the air handling unit 202.

The heat exchanger 302 may also include a plurality of second inlets 310 disposed at or along a bottom of the heat exchanger 302. The plurality of second inlets 310 may be disposed away from or at an end opposite the plurality of first inlets 304. The plurality of second inlets 310 may be configured to receive outgoing air from within the interior 200 of the portable shelter 100. The outgoing air may pass through the heat exchanger 302 before exiting the portable shelter 100 via a plurality of second outlets 312. The flow of the outgoing air through the air handling unit 202, and the heat exchanger 302, may be represented by arrows 314(A), which shows the outgoing air entering the air handling unit 202, and arrows 314(B), which show the outgoing air exiting the air handling unit 202.

In some instances, the plurality of first inlets 304 may be spaced away from but parallel to the plurality of second inlets 310. Additionally or alternatively, the plurality of first outlets 306 may be spaced away from but parallel to the plurality of second outlets 312. Furthermore, in some instances, the plurality of first inlets 304 may be perpendicular with the plurality of first outlets 306 and/or the plurality of second inlets 310 may be perpendicular with the plurality of second outlets inlets 312.

The directional flows of the incoming air and the outgoing air through the heat exchanger 302, as indicated by arrows 308(A), 308(B), 314(A), and 314(B), may allow the incoming air to exchange heat with the outgoing air. That is, as discussed in more detail herein, extending between the plurality of first inlets 304 and the plurality of first outlets 306 may be a plurality of first channels while extending between the plurality of second inlets 310 and the plurality of second outlets 312 may be a plurality of second channels. The plurality of first channels and the plurality of second channels may be alternatingly positioned within the heat exchanger 302 such that heat may be transferred between the outgoing air and the incoming air.

To create the incoming air flow and the outgoing air flow, the air handling unit 202 may include fans 316(A) and 316(B). In some instances, the fan 316(A) may create the incoming air flow by blowing or pushing the incoming air through the heat exchanger 302. In some instances, the fan 316(B) may create the outgoing air flow by drawing or pulling the incoming air through the heat exchanger 302. The fans 316(A) and 316(B) may include axial fans or centrifugal fans.

FIG. 3 illustrates the fans 316(A) and 316(B) as being disposed within the wall 300 of the portable shelter 100. However, in some instances, the fans 316(A) and 316(B) may be located on the exterior of the portable shelter 100 or within the interior 200 of the portable shelter 100, such as being adjacent to the plurality of first outlets 306 and/or the plurality of second inlets 310, respectively. In addition, filters may be included to limit or prevent dirt, dust, or other debris from entering the interior 200.

The cover 204 may encapsulate or surround the heat exchanger 302. In some instances, the cover 204 may have the opening 206 configured for the plurality of first outlets 306 and the opening 208 configured for the plurality of second inlets 310. The opening 206 may closely abut or couple to the plurality of first outlets 306. In some instances, to separate the plurality of first outlets 306 and the plurality of second inlets 310, the plurality of second inlets 310 may be recessed away or disposed away from the opening 208. As such, the incoming air may be prevented from immediately being drawn into the plurality of second inlets 310.

The cover 204 may also have an opening 318 for the plurality of first inlets 304 and an opening 320 for the plurality of second outlets 312. In some instances, the cover 204 may also have a barrier or flange 322 disposed between the opening 318 and the opening 320. In some instances, the flange 322 may isolate the incoming air flow and the outgoing air flow. That is, to prevent the incoming air from entering the plurality of second outlets 312 and the outgoing air from entering the plurality of first inlets 304, the flange 322 may act as a barrier to as to prevent the fan 316(A) from blowing incoming air into the plurality of second outlets 312 while also preventing the fan 316(B) from blowing outgoing air into the plurality of first inlets 304.

At an end opposite to the plurality of second inlets 310, the plurality of first inlets 304 may be separated from the cover 204, creating a pocket 324 whereby the incoming air traverses or passes before entering the plurality of first inlets 304. That is, in some instances, the fan 316(A) may be separated from the plurality of first inlets 304. However, in some instances, the plurality of first inlets 304 may be extended or continued towards the opening 318. For instance, the heat exchanger 302, by being rounded, extended, and/or directed towards the fan 316(A), may cause the plurality of first inlets 304 to be disposed closer to or coupled to the opening 318 and/or the fan 316(A).

The shrouds 108 may be disposed adjacent to the fan 316(A) and the fan 316(B). In some instances, the shrouds 108 may prevent the fan 316(A) from intaking outgoing air. Stated another way, the flange 112(B) on the shroud 108 may diffuse the outgoing air away from where the incoming air is drawn into the fan 316(A) to reduce the fan 316(A) from taking in outgoing air.

Figure 4:
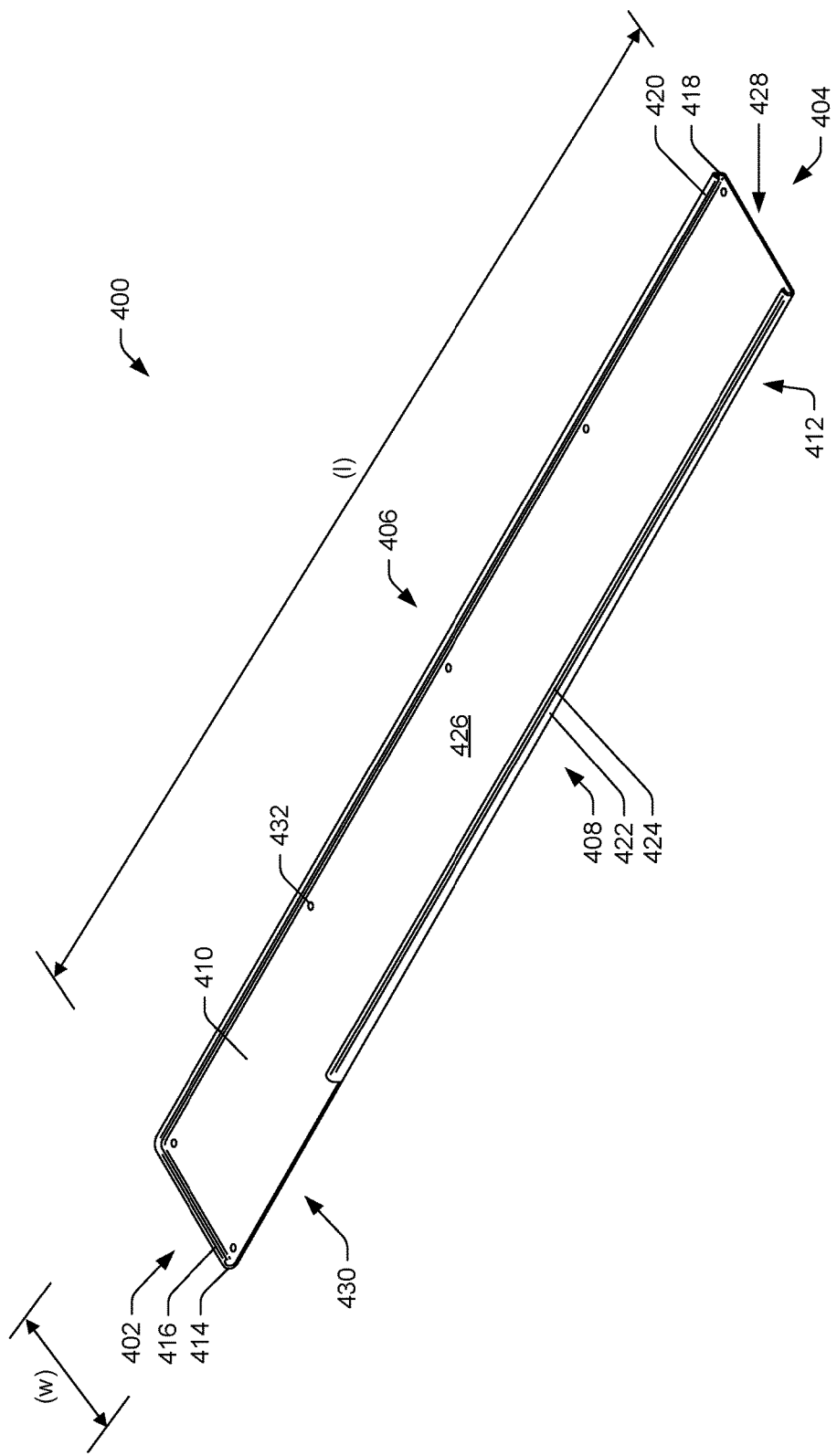
FIG. 4 is a perspective view of a panel included in a heat exchanger of the example air handling unit of FIG. 2.

FIG. 4 illustrates a panel 400 that may be included within the heat exchanger 302. However, while FIG. 4 illustrates a particular layout, configuration, or shape of the panel 400, the panel 400 may include differently shaped panels or may resemble other plates or dividers.

In some instances, the panel 400 may include a first end 402, a second end 404, a first side 406 disposed between the first end 402 and the second end 404, as well as a second side 408 disposed between the first end 402 and the second end 404. In addition, the panel 400 may include a top surface 410 and a bottom surface 412 (pointing to an underneath side of the panel 400).

The first end 402 may include a sidewall 414 that spans a width (w) of the panel 400. The sidewall 414 may include a lip 416 that overhangs at least a portion or is disposed above the top surface 410 of the panel 400.

The first side 406 may have a sidewall 418 that spans a length (l) of the first side 406. The sidewall 418 may include a lip 420 that overhangs at least a portion or is disposed above the top surface 410 of the panel 400.

In some instances, the second side 408 may have a sidewall 422 that spans less than the length (l) of the panel 400. The sidewall 422 may include a lip 424 that overhangs at least a portion or is disposed above the top surface 410 of the panel 400. In some instances, the lip 424 may span a length of the sidewall 422.

In combination, the sidewall 414, the lip 416, the sidewall 418, the lip 420, the sidewall 422, and the lip 424 may create a channel 426. In some instances, the channel 426 may be interposed between an opening 428 and an opening 430. That is, given that no sidewall is included on the second end 404, the opening 428 may be formed via a gap interposed between the first side 406 and the second side 408. Similarly, as the sidewall 422 of the second side 408 may extend less than the length (l) of the panel 400, the opening 430 may be formed via a gap interposed between the first end 402 and an end of the sidewall 422 and the flange 424. In some instances, the opening 430 may be disposed adjacent the first end 402 of the panel 400, such that the opening 430 may be defined in part by the sidewall 414 of the first end 402.

In some instances, the opening 428 and the opening 430 may be of a similar or different size. That is, a width of the of the opening 430 may be similar, different, or equal to the width (w) of the panel. In addition, the opening 428 may be perpendicular to the opening 430.

As discussed in more detail herein, the opening 428 may correspond to an inlet of the channel 426 while the opening 430 may correspond to an outlet of the channel 426. Additionally, to create the heat exchanger 302, a first subset or plurality of panels 400 may be orientated in a first direction, so as to create a first subset or plurality of channels in the heat exchanger 302, while a second subset or plurality of panels 400 may be orientated in a second direction, so as to create a second subset or plurality of channels in the heat exchanger 302. Furthermore, as the panel 400 is included within the heat exchanger 302, to increase a surface area of the panel 400, the top surface 410 and/or the bottom surface 412 of the panel 400 may include dimples, protrusions, indentations, or other formations. Moreover, the panel 400 may also include holes 432 used to couple multiple panels together.

Furthermore, the panel 400 may include more than two ends or more than two sides, with the openings disposed on any combination of the ends and the sides. In addition, the panel 400 may be rectangular-shaped, may take other shapes, or may include any combination, such as portions of the panel being circular, square, hexagonal, etc.

Figure 5:
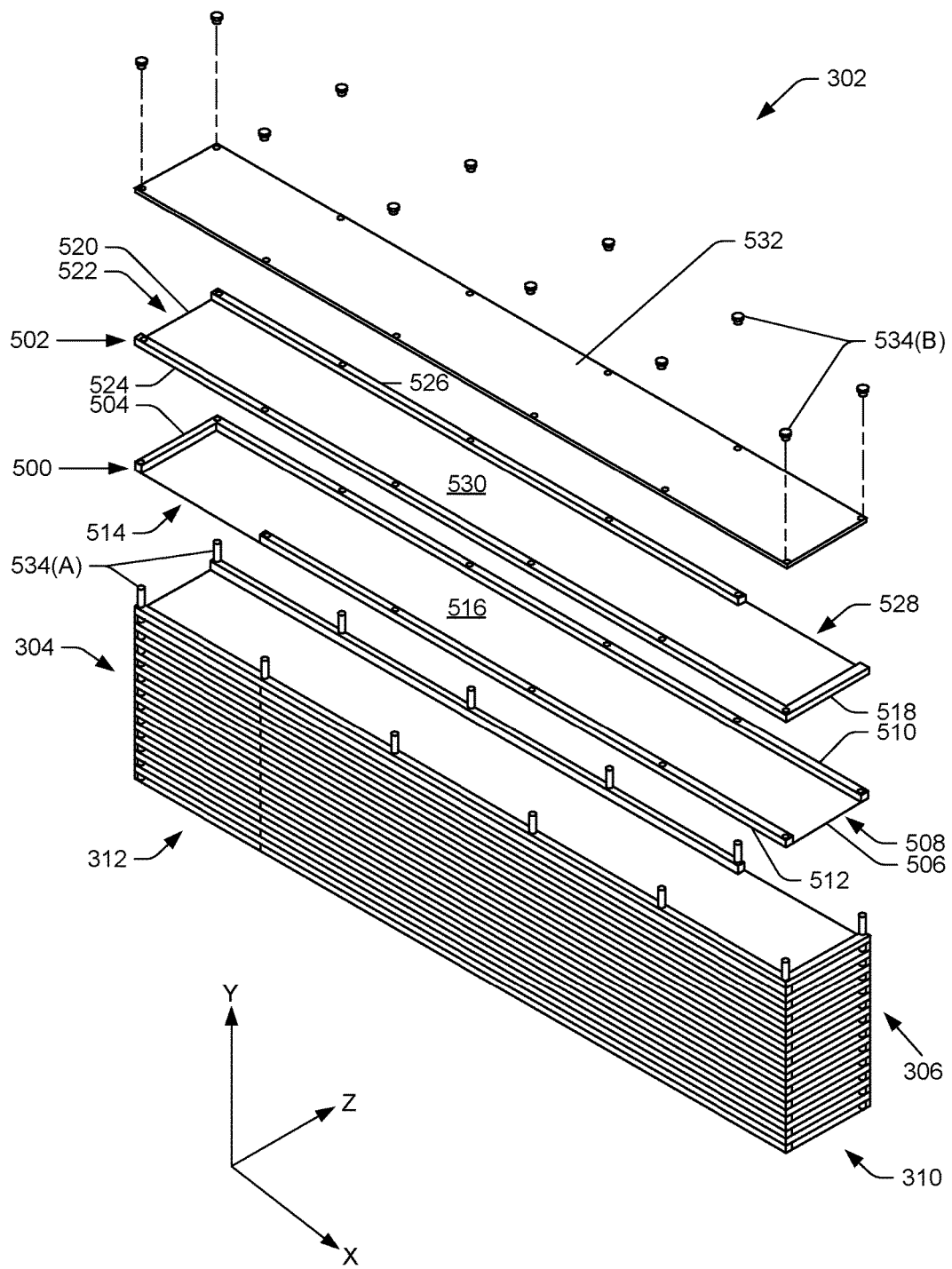
FIG. 5 is a perspective exploded view of the heat exchanger included in the example air handling unit of FIG. 2.

FIG. 5 illustrates a perspective view the heat exchanger 302, showing part of the heat exchanger 302 being exploded in order to illustrate the assembly of the heat exchanger 302. As alluded to previously in the discussion of FIG. 4, in some instances, the heat exchanger 302 may be formed by stacking the panel 400 amongst one another. Furthermore, the Cartesian (X-Y-Z) coordinate system included in FIG. 5 is meant to assist in the discussion of the heat exchanger 302 and will be referenced herein.

The heat exchanger 302 may include a first subset or plurality of first panels 500 arranged in a first direction and a second subset or plurality of second panels 502 arranged in a second direction. In some instances, the plurality of first panels 500 and the plurality of second panels 502 may represent the panel 400, with one of the plurality of first panels 500 or one the plurality of second panels 502 being rotated 180 degrees relative to the other.

To form the heat exchanger 302, the plurality of first panels 500 and the plurality of second panels 502 may be alternatingly stacked such that panels of the plurality of first panels 500 are interposed between panels of the plurality of second panels 502, and vice versa. In doing so, the plurality of first inlets 304, the plurality of first outlets 306, the plurality of second inlets 310, and the plurality of second outlets 312 may be formed.

A first end 504 of the plurality of first panels 500 may include a sidewall and a second end 506 with an opening 508. In some instances, the first end 504 may include a flange disposed over at least portion of a top surface of the plurality of first panels 500. In addition, the plurality of first panels 500 may include a first side 510 and a second side 512. The first side 510 and the second side 512 may include a sidewall and a flange disposed over at least a portion of the top surface of the plurality of first panels 500. In some instances, the sidewall on the second side 512 may extend less than a length of the plurality of first panels 500 to form an opening 514. Disposed between the opening 508 and the opening 514 may be a plurality of first channels 516.

Similarly, the plurality of second panels 502 may include a first end 518 and a second end 520 with an opening 522. In some instances, the first end 518 may include a sidewall with a flange disposed over at least portion of a top surface of the plurality of second panels 502. In addition, the plurality of second panels 502 may include a first side 524 and a second side 526. In some instances, the first side 524 and the second side 526 may include sidewalls and flanges, respectively, disposed over at least a portion of the top surface of the plurality of second panels 502. The sidewall on the second side 526 may extend less than a length of the plurality of second panels 502 to form an opening 528. Disposed between the opening 522 and the opening 528 may be a plurality of second channels 530.

Moving to the formation of the heat exchanger 302, the plurality of first panels 500 and the plurality of second panels 502 may be alternatingly rotated and stacked such that the first end 504 of the plurality of first panels 500 align or are coplanar with the second end 520 of the plurality of second panels 502. Moreover, the first side 510 of the plurality of first panels 500 may be aligned and coplanar with the second side 526 of the plurality of second panels 502. The first end 518 of the plurality of second panels 502 may be aligned and coplanar with the second end 506 of the plurality of first panels 500 while the first side 524 of the plurality of second panels 502 align or are coplanar with the second side 512 of the plurality of first panels 500.

Through aligning the plurality of first panels 500 and the plurality of second panels 502, as outlined above, the plurality of first panels 500 and the plurality of second panels 502 may be coupled to another to form the plurality of first inlets 304, the plurality of first outlets 306, the plurality of second inlets 310, and the plurality of second outlets 312. That is, the opening 522, the opening 528, the opening 508, and the opening 514 may form the plurality of first inlets 304, the plurality of first outlets 306, the plurality of second inlets 310, and the plurality of second outlets 312, respectively. Therefore, interposed between the plurality of first inlets 304 may be the sidewall of the first end 504 of the plurality of first panels 500 while interposed between the plurality of first outlets 306 may be the sidewall of the sidewall of the first side 510 of the plurality of first panels 500. In addition, interposed between the plurality of second inlets 310 may be the sidewall of the first end 508 while interposed between the plurality of second outlets 312 may be the sidewall of the second side 524 of the plurality of second panels 502.

The sidewalls on the first end 504, the first side 510, and the second side 512 of the plurality of first panels 500 may serve to offset the plurality of second panels 502 to form the plurality of first channels 516. That is, the plurality of first channels 516 may be interposed between the plurality of first panels 500 and the plurality of second panels 502. In some instances, the plurality of first panels 500 may couple to the flanges included on the sidewalls of the first end 518, the first side 524, and the second side 526 of the plurality of second panels 502.

The sidewalls of the first end 518, the first side 524, and the second side 526 of the plurality of second panels 502 may serve to offset the plurality of first panels 500 to form the plurality of second channels 530. Accordingly, the plurality of second channels 530 may be interposed between the plurality of second panels 502 and the plurality of first panels 500. In some instances, the plurality of second panels 502 may couple to the flanges included on the sidewalls of the first end 504, the first side 510, and the second side 512 of the plurality of first panels 500.

On a last or final of the alternatingly stacked plurality of first panels 500 or the plurality of second panels 502 (as shown in FIG. 5) may be a plate 532 that encloses a channel of either the plurality of first channels 516 or the plurality of second channels 530 (as shown in FIG. 5). In some instances, the plate 532 may not include any openings and may be flat to enclose either a channel of the plurality of first channels 516 or a channel of the plurality of second channels 530.

To couple the plurality of first panels 500 and the plurality of second panels 502 together, fasteners 534(A) may be disposed through the plurality of first panels 500 and the plurality of second panels 502. In some instances, the fastener 534(A) may be an elongated bolt or rod disposed through respective holes in the plurality of first panels 500 and the plurality of second panels 502, and thereafter tightened using fastener 534(B), which may be a nut. However, the plurality of first panels 500 and the plurality of second panels 502 may be coupled together through being bonded (e.g., welding or adhesives), brazed, crimping, snap-fit, tongue and grooves, or using other mechanical fasteners, such as screws. In addition, to isolate and/or prevent intermixing of the incoming air flow and the outgoing air flow through the heat exchanger 302, tape, caulk, or other sealants may be disposed between gaps or openings of the alternatingly stacked plurality of first panels 500 and the plurality of second panels 502.

With the alternatingly stacked plurality of first panels 500 and the plurality of second panels 502, the heat exchanger 302 may be formed such that the incoming air flow and the outgoing air flow exchange heat via the plurality of first channels 516 and the plurality second channels 530. In some instances, the plurality of first inlets 304 may be disposed on the second end 520 of the plurality of second panels 500 (e.g., the opening 522) while the plurality of first outlets 306 (e.g., the opening 528) may be disposed on the second side 526 of the plurality of second panels 502. The plurality of second inlets 310 may be disposed on the second end 506 of the plurality of first panels 500 (e.g., the opening 508) while the plurality of second outlets 312 may be disposed on the second side 512 of the plurality of first panels 500 (e.g., the opening 512). In doing so, the outgoing air may flow within the plurality of first channels 516 while the incoming air may flow within the plurality of second channels 530, thereby condition the incoming air before reaching the interior 200 of the portable shelter 100.

Reference is now made to the Cartesian coordinate system included in FIG. 5. In some instances, the plurality of first panels 500 and the plurality of second panels 502 may be stacked in the Y-direction along X-Z planes that are spaced apart in the Y-direction. In addition, one of the plurality of first panels 500 or the plurality of second panels 502 may be rotated about the Y-axis 180 degrees. With the plurality of alternatingly stacked and rotated plurality of first panels 500 and the plurality of second panels 502, the plurality of first inlets 304 may be disposed along a first Y-Z plane spaced apart in the X direction from the plurality of second inlets 310 disposed along a second Y-Z plane. Furthermore, the plurality of first outlets 306 may be disposed along a first X-Y plane spaced apart in the Z direction from the plurality of second outlets 312 disposed along a second X-Y plane. Moreover, the plate 532 may be coupled to a last of the plurality of first panels 500 or the plurality of second panels 502 along a X-Z plane.

While the heat exchanger 302 is shown as having a specified number of inlets and outlets and/or using a specified number of panels, there may be any number of inlets/outlets created by the alternatingly stacked panels forming the heat exchanger 302. That is, any number of alternatingly stacked and rotated plurality of first panels 500 and the plurality of second panels 502 may be included in the heat exchanger 302, with a last of the alternatingly stacked plurality of first panels 500 and the plurality of second panels 502 being coupled to the second panel 532.

Figure 6A:
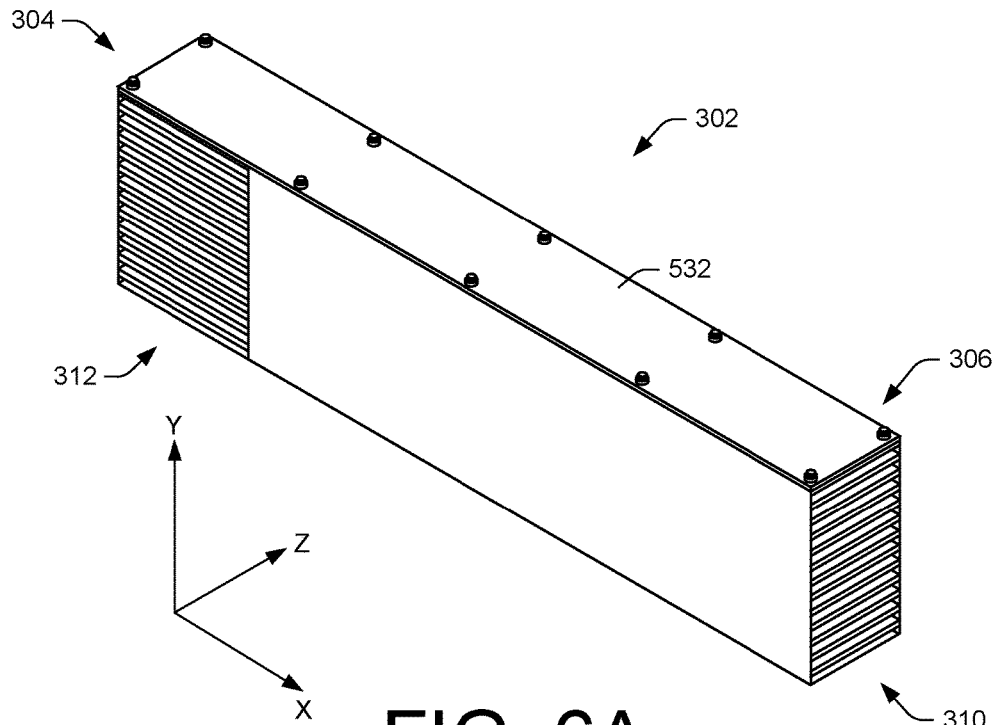
FIG. 6A is a first perspective view of the heat exchanger included in the example air handling unit of FIG. 2.
Figure 6B:
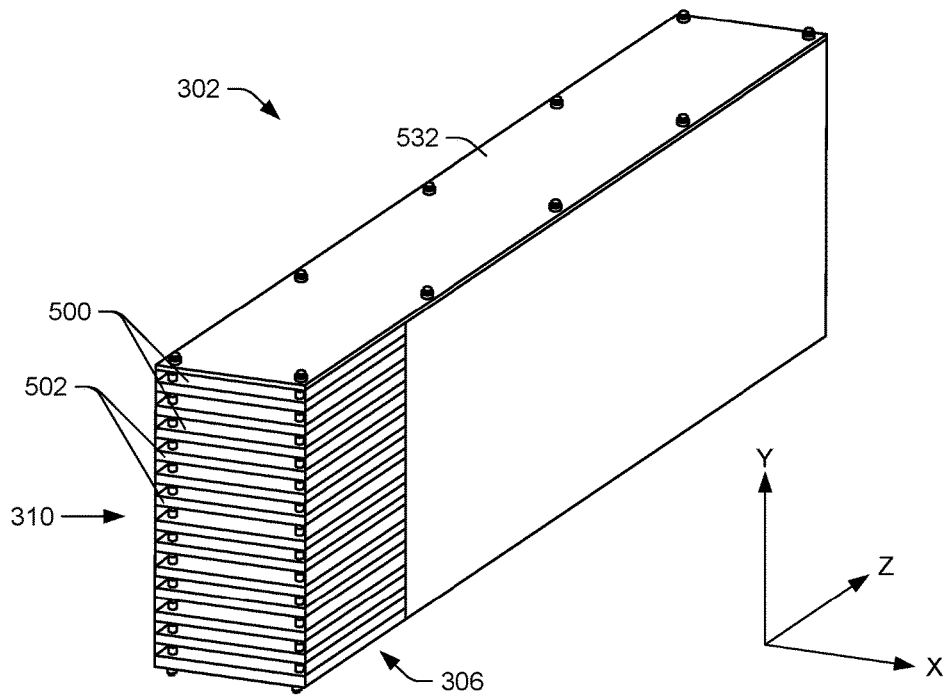
FIG. 6B is a second perspective view of the heat exchanger of FIG. 6A included in the example air handling unit of FIG. 2.

FIGS. 6A and 6B illustrate perspective views of the heat exchanger 302. Compared to FIG. 5, FIGS. 6A and 6B illustrate the heat exchanger 302 as being assembled, with the plurality of first panels 500 and the plurality of second panels 502 being in a stacked relationship.

Through the coupling of the plurality of first panels 500 and the plurality of second panels 502, the plurality of first inlets 304 (along the first Y-Z plane), the plurality of first outlets 306 (along the first X-Y plane), the plurality of second inlets 310 (along the second Y-Z plane spaced apart in the X direction from the first Y-Z plane), and the plurality of second outlets 312 (along a second X-Y plane spaced apart in the Z direction from the first X-Y plane) may be formed. The plate 532 may be coupled to a last alternatingly panel of the plurality of first panels 500 and/or the plurality of second panels 502.

Figures 7, 8:
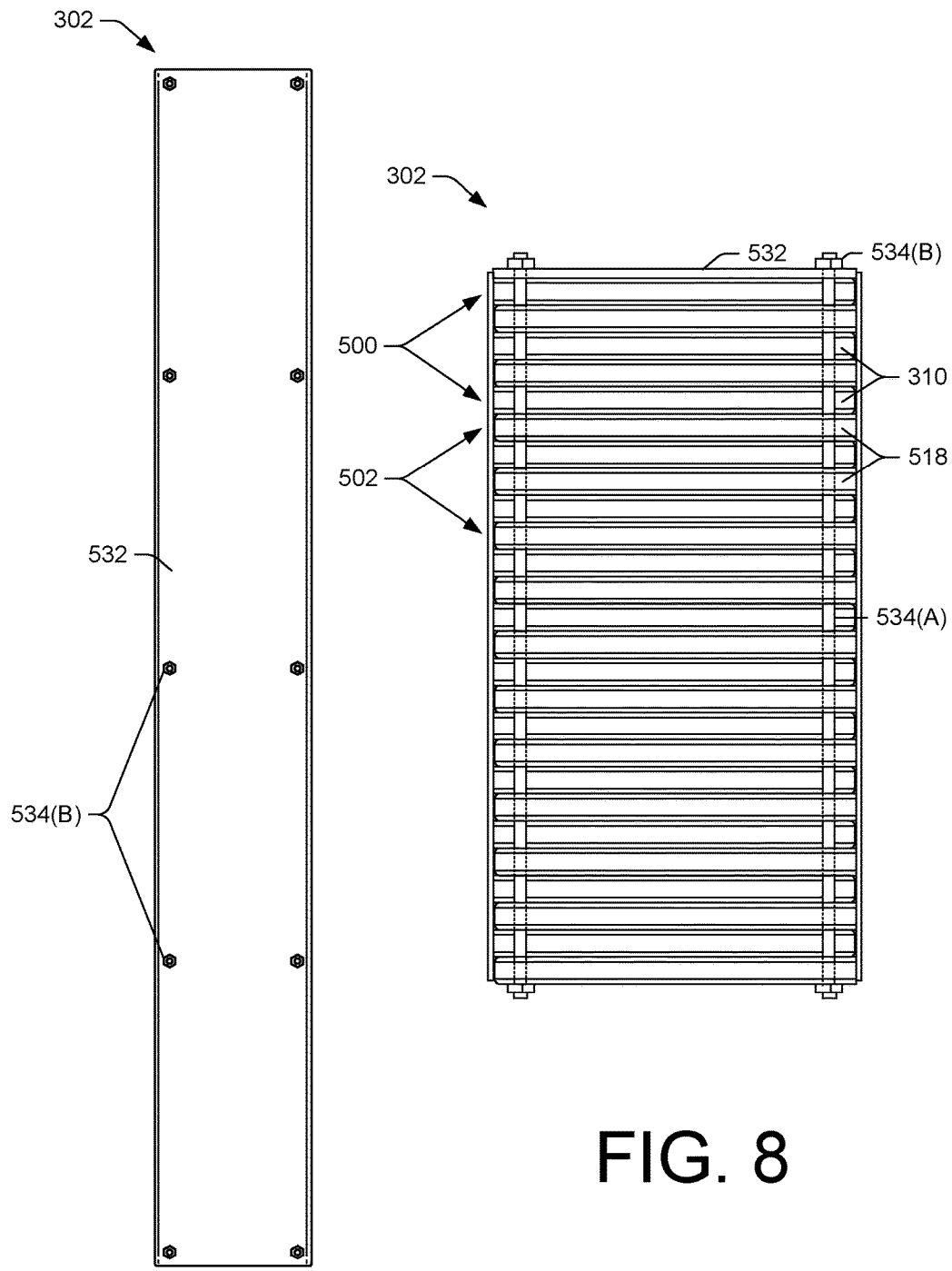
FIG. 7 is a side view of the heat exchanger of FIG. 6A.
FIG. 8 is an end view of the heat exchanger of FIG. 6A.

FIG. 7 is a side view of the heat exchanger 302, with the plate 532 enclosing a last of the plurality of first channels 516 or the plurality of second channels 530. In addition, FIG. 7 illustrates the fasteners 534(B) coupling the plurality of first panels 500, the plurality of second panels 502, and the plate 532 together.

FIG. 8 illustrates an end view of the heat exchanger 302, showing the plurality of first panels 500 and the plurality of second panels 502 being alternatingly stacked. Given that the heat exchanger 302 may be symmetrical, the end depicted in FIG. 8 may represent the plurality of first inlets 304 or the plurality of second inlets 310. However, in the discussion of FIG. 8, the plurality of second inlets 310 may be interposed between the sidewall of the first end 518 of the plurality of second panels 502, with the plate 532 coupling to a last of the plurality of first panels 500.

In addition, FIG. 8 illustrates the fastener 534(A) extending through the plurality of first panels 500 and the plurality of second panels 502 and fastener 534(B) attached thereto to couple the plurality of first panels 500 and the plurality of second panels 502 together.

Figure 9:
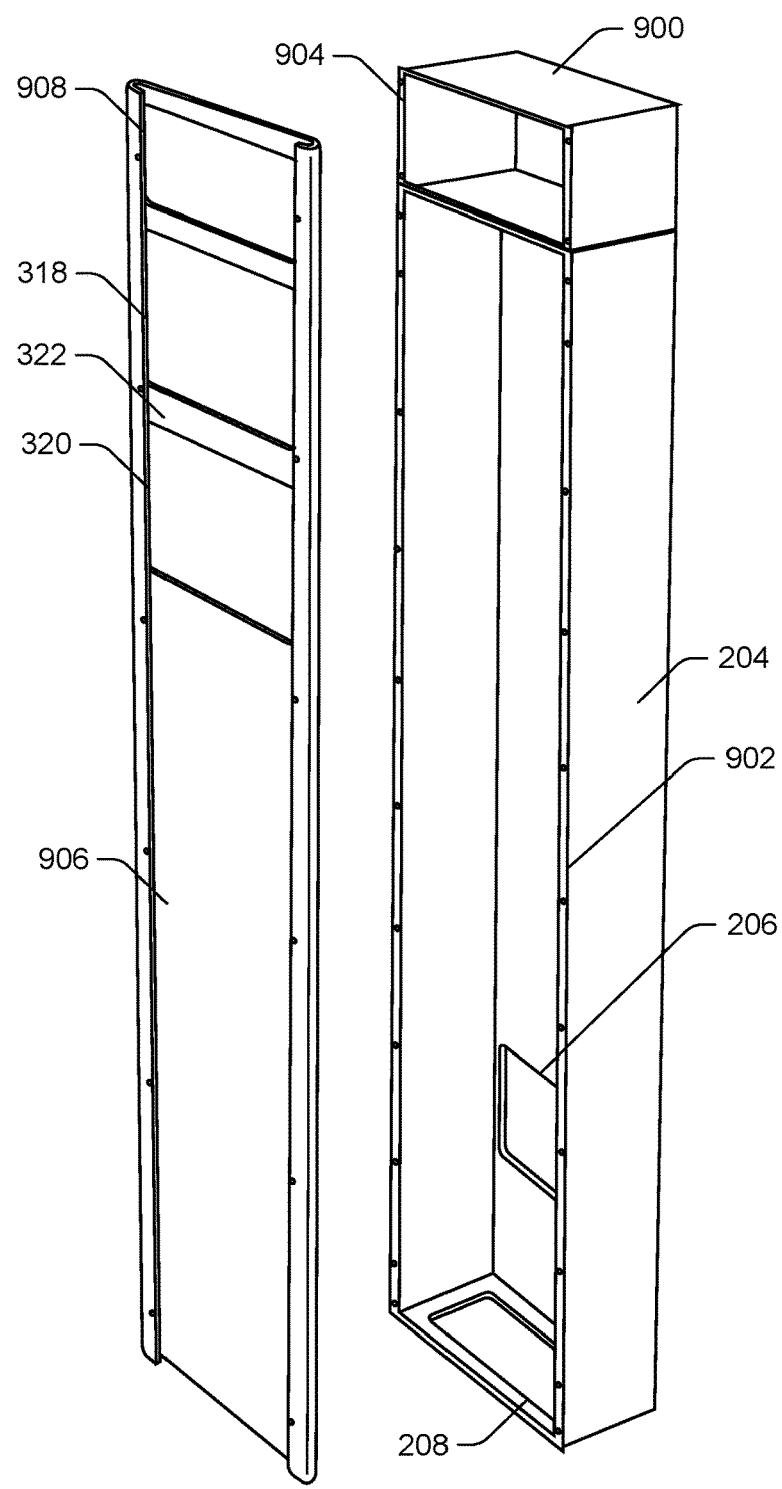
FIG. 9 is a perspective view of a cover of the example air handling unit of FIG. 2.

FIG. 9 illustrates the cover 204 including the opening 206 and the opening 208. In some instances, and as mentioned previously, the cover 204 may be sized and configured to house and retain the heat exchanger 302. That is, a depth of the cover 204 may be complimentary or corresponding to a width of the heat exchanger 302. In addition, a depth or height of the heat exchanger 302, as defined by an amount of the plurality of first panels 500 and the plurality of second panels 502 that are alternatingly stacked, may reside within a width of the cover 204. Furthermore, a length of the cover 204 may be complimentary to the length of the heat exchanger 302, such that when the heat exchanger 302 is disposed within the cover, the pocket 324 is disposed adjacent the plurality of first inlets 304, and the plurality of second inlets 310 are recessed from the opening 208. Accordingly, the cover 204 may have a cavity, compartment, or chamber sized to house the heat exchanger 302.

A mechanical cover 900 may couple to the cover 204, may be integrated with the cover 204, or may be mounted proximal to where the cover 204 mounts to the portable shelter 100. In some instances, the mechanical cover 900 may house internal components of the air handling unit 202 such as power supplies, control units, or operational equipment or cables for the fan 316(A) and the fan 316(B).

The cover 204 may include a flange 902 and the mechanical cover 900 may include a flange 904. The flange 902 and the flange 904 may be used to couple the cover 204 and the mechanical cover 900 to the wall 300 of the portable shelter 100, respectively.

The cover 204 may include a face plate 906 that couples to the cover 204 and/or the mechanical cover 900. The face plate 906 may include an opening 908, the opening 318, and the opening 320. In some instances, the opening 908 may be aligned with an opening in the mechanical cover 900 to allow components within the mechanical cover to route or traverse the opening 908.

The opening 318 may provide a passageway for the incoming air to reach the plurality of first inlets 304 and pass through the heat exchanger 302. Similarly, the opening 320 may provide a passageway for the outgoing air exiting the plurality of second outlets 312. As mentioned in FIG. 3, the flange 322 may be interposed between the opening 318 and the opening 320 to prevent a mixture of the incoming air and the outgoing air. That is, the flange 322 may separate the plurality of first inlets 304 and the plurality of second outlets 312.

Figure 10A:
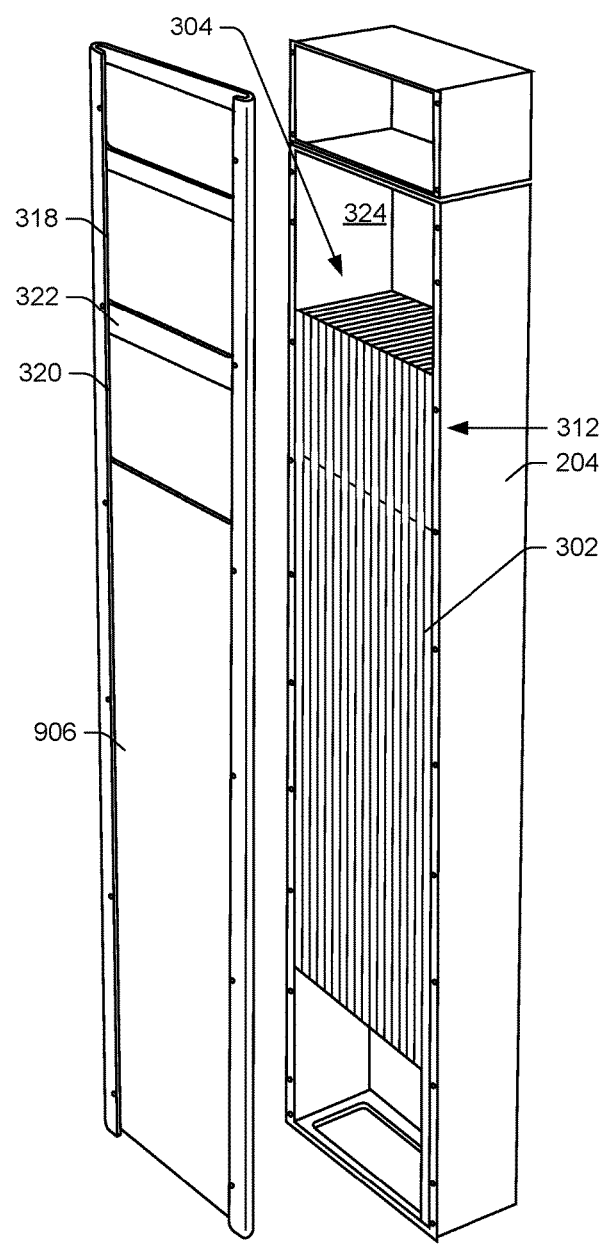
FIG. 10A is a partial exploded perspective view of the example air handling unit of FIG. 2.
Figure 10B:
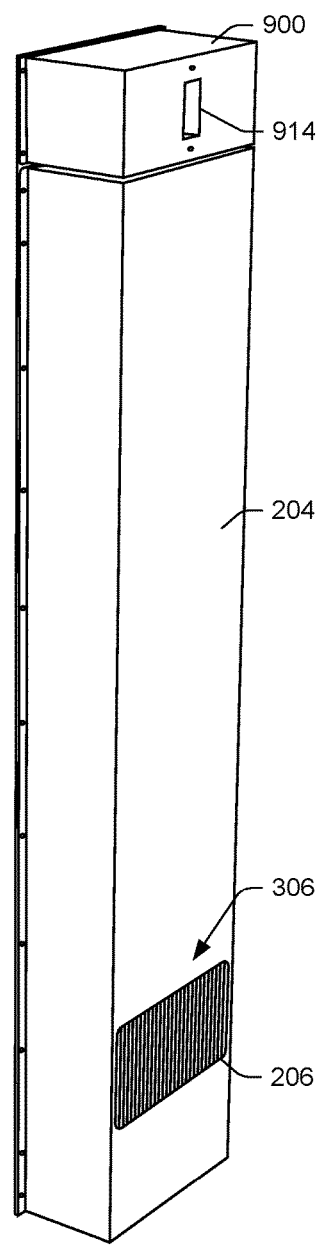
FIG. 10B is a partial perspective view of the example air handling unit of FIG. 2.
Figure 10C:
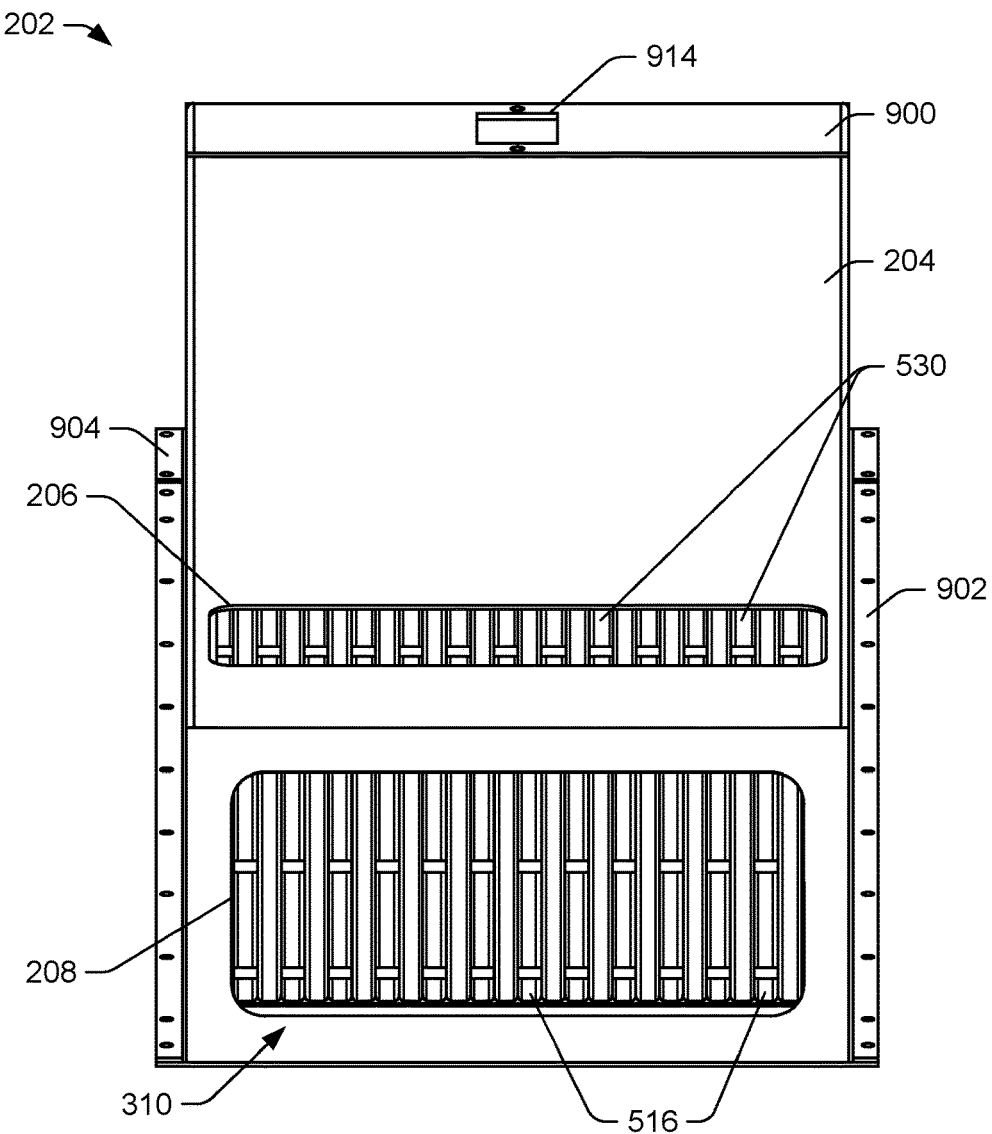
FIG. 10C is a partial perspective view of the example air handling unit of FIG. 2.

FIGS. 10A, 10B, and 10C illustrate various views of the heat exchanger 302 disposed within the cover 204 and the face plate 906. However, in FIG. 10A, the face plate 906 is shown as being disposed away from the cover 204 in order to illustrate the heat exchanger 302 disposed within the cover 204. Once the face plate 906 is coupled to the cover 204, the heat exchanger 302 may be interposed between the cover 204 and the face plate 906. In addition, once coupled, the flange 322 on the face plate 906 may separate the plurality of first inlets 304 and the plurality of second outlets 312. In some instances, the heat exchanger 302 may be coupled to portions of the cover 204 and/or the face plate 906 via fasteners, adhesives, and/or being welded, thereby securing the heat exchanger 302 within the cover 204.

When the heat exchanger 302 is disposed within the cover 204 and the face plate 906 is coupled to the cover 204, the opening 320 may be situated, aligned, disposed, or positioned over the plurality of second outlets 312. Stated another way, the plurality of second outlets 312 may be disposed within a perimeter or outline of the opening 320. The opening 206 may be situated, aligned, disposed, or positioned over the plurality of first outlets 306 (FIG. 10B), or the plurality of first outlets may be disposed within a footprint or perimeter of the opening 206. In doing so, the incoming air may exit the opening 206 and into the interior 200 of the portable shelter 100 while the outgoing air may be exhausted out the opening 320.

In some instances, the opening 206 and the opening 320 may be sized according to the plurality of first outlets 306 and the plurality of second outlets 312, respectively. That is, the plurality of first outlets 306 and the plurality of second outlets 312 may be recessed within the opening 206 and the opening 320, respectively, such that the incoming air is permitted to exit through the plurality of first outlets 306 via the opening 206 and outgoing air is permitted to exit the plurality of second outlets 312 via the opening 320.

The plurality of first inlets 304 may be disposed away from the opening 318. In some instances, the plurality of first inlets 304 may not abut, contact, or couple to the face plate 906 adjacent to the opening 318. That is, the pocket 324 may be interposed between the plurality of first inlets 304 and the opening 318. In some instances, however, the plurality of first inlets 304 may be extended or otherwise elongated such that the plurality of first inlets 304 are disposed adjacent to the opening 318 or abut the opening 318. Therefore, in some instances, the pocket 324 may not be included within the air handling unit 202.

The mechanical cover 900 may include a port 914 for receiving cables, switches, or other mechanical components for the operation of the air handling unit 202.

FIG. 10C shows the air handling unit 202, with the plurality of second inlets 310 being situated, aligned, disposed, and/or recessed within the opening 208, thereby receiving outgoing air. In addition, FIG. 10C illustrates the interplay between the plurality of first channels 516 and the plurality of second channels 530, showing the plurality of first channels 516 being interposed between the plurality of second channels 530, and vice versa.

Figure 11:
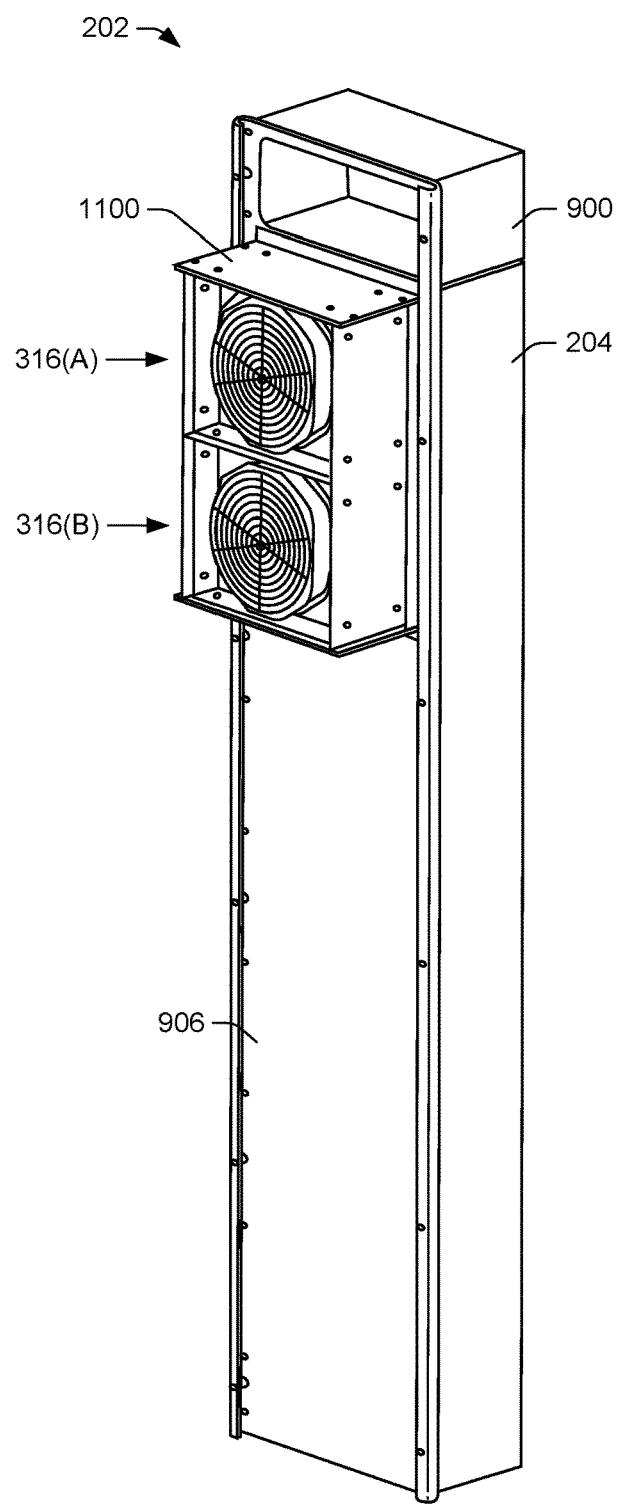
FIG. 11 is a perspective view of the example air handling unit of FIG. 2.

FIG. 11 illustrates the air handling unit 202, with the cover 204, the mechanical cover 900, the face plate 906, and the fan 316(A) and the fan 316(B). In some instances, the fan 316(A) and the fan 316(B) may be disposed within an enclosure 1100. When the air handling unit 202 is coupled to the portable shelter 100, the enclosure 1100 may be disposed through the wall 300 of the portable shelter 100.

CONCLUSION

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A heat exchanger comprising:
a plurality of panels, wherein individual panels of the plurality of panels include:
a top surface and a bottom surface;
a first end having a sidewall and a flange disposed over at least a portion of the top surface, wherein the sidewall and the flange of the first end extend a width of the panel;
a second end;
a first side having a sidewall and a flange disposed over at least a portion of the top surface, wherein the sidewall and the flange of the first side extend a length of the panel;
a second side having a sidewall and a flange disposed over at least a portion of the top surface, wherein the sidewall and the flange of the second side extend less than the length of the panel, and
wherein the plurality of panels are alternatingly stacked and rotated 180 degrees relative to one another such that the first end of a first plurality of panels align with the second end of a second plurality of panels and the first side of the first plurality of panels align with the second side of the second plurality of panels, and wherein the flanges of the first end, the first side, and the second side of the first plurality of panels couple to the bottom surface of the panels of the second plurality of panels, and wherein the flanges of the first end, the first side, and the second side of the second plurality of panels couple to the bottom surface of the panels of the first plurality of panels.

2. The heat exchanger of claim 1, wherein the second end of the panel includes an inlet interposed between the first side and the second side, and wherein the second side includes an outlet disposed in a portion of the sidewall and the flange of the second side that extends less than the length of the panel, and wherein when the panels are alternatingly stacked and rotated 180 degrees, a first plurality of inlets, a first plurality of outlets, a second plurality of inlets, and a second plurality of outlets are formed.

3. The heat exchanger of claim 2, wherein at least one of the first plurality of inlets are parallel with the second plurality of inlets or the first plurality of outlets are parallel with the second plurality of outlets.

4. The heat exchanger of claim 1, further comprising a plate disposed over one of a last of the alternatingly stacked and rotated first plurality of panels or second plurality of panels.

5. The heat exchanger of claim 1, further comprising:
a plurality of holes extending through the panel; and
fasteners disposed through the plurality of holes to fasten the alternatingly stacked and rotated first plurality of panels and the second plurality of panels.

6. The heat exchanger of claim 1, further comprising a cover including:
a face plate having:
a first opening;
a second opening; and
a flange disposed between the first opening and the second opening;
a pocket having:
a first opening; and
a second opening; and
wherein the heat exchanger is disposed within the pocket such that at least a portion of the first plurality of outlets are disposed within an outline of the first opening of the pocket, and at least a portion of the second plurality of outlets are disposed within an outline of the second opening in the face plate.

7. A wall mounted heat exchanger comprising:
a plurality of panels, wherein individual panels of the plurality of panels include:
a first end;
a second end;
a first sidewall;
a second sidewall;
a first gap disposed along the second end; and
a second gap disposed along the second sidewall; and
wherein a first subset of panels of the plurality of panels are arranged such that the first ends of the first subset of panels are co-planar with the second ends of a second subset of panels of the plurality of panels, and wherein the first sidewalls of the first subset of panels are co-planar with the second sidewalls of the second subset of panels to form:
a plurality of first inlets from the second gap;
a plurality of first outlets from the first gap;
a plurality of second inlets from the second gap; and
a plurality of second outlets from the first gap.

8. The wall mounted heat exchanger of claim 7, wherein the first subset of panels is rotated 180 degrees relative to the second subset of panels, and wherein panels of the first subset of panels are interleaved with panels of the second subset of panels.

9. The wall mounted heat exchanger of claim 8, further comprising a plate disposed over stacked surface of at least one panel of the plurality of panels.

10. The wall mounted head exchanger of claim 7, further comprising:
a first plurality of channels disposed between the first plurality of inlets and the first plurality of outlets; and
a second plurality of channels disposed between the second plurality of inlets and the second plurality of outlets, and
wherein adjacent channels of the first plurality of channels and the second plurality of panels share a common wall.

11. The wall mounted heat exchanger of claim 7, wherein at least one of:
the first plurality of inlets are parallel to the second plurality of inlets, or
the first plurality of outlets are parallel to the second plurality of outlets.

12. The wall mounted heat exchanger of claim 7, further comprising a fan disposed adjacent to at least one of the first plurality of inlets or the second plurality of outlets.

13. The wall mounted heat exchanger of claim 7, wherein the first subset of panels comprises at least two first panels and the second subset of panels comprises at least two second panels.

14. A portable shelter comprising:
a first end having a door;
a second end;
a top;
a bottom;
sidewalls, at least one of which is configured to move from a stowed state to a deployed state; and
a heat exchanger disposed on the first end adjacent to the door, the heat exchanger including:
a plurality of panels, where individual panels have:
a first end;
a second end;
a first sidewall;
a second sidewall;
a first gap disposed along the second end; and
a second gap disposed along the second sidewall; and
wherein a first subset of panels of the plurality of panels are alternatingly stacked with a second subset of panels of the plurality of panels such that the first ends of the first subset of panels are co-planar with the second ends of the second subset of panels, and wherein the first sidewalls of the first subset of panels are co-planar with the second sidewalls of the second subset of panels.

15. The portable shelter of claim 14, wherein the first gap disposed along the second ends of the first subset of panels forms a first plurality of inlets, the second gap disposed along the second sidewalls of the first subset of panels forms a first plurality of outlets, the first gap disposed along the second ends of the second subset of panels forms a second plurality of inlets, and the second gap disposed along the second sidewalls of the second subset of panels forms a second plurality of outlets.

16. The portable shelter of claim 15 wherein the first end of the portable shelter has a first opening and a second opening, and wherein at least a portion of the first plurality of outlets are within a perimeter of the second opening of the first end of the portable shelter.

17. The portable shelter of claim 16, further comprising at least one of:
a first fan disposed adjacent to the first opening, or
a second fan disposed adjacent to the second opening.

18. The portable shelter of claim 16, further comprising at least one of:
a first filter disposed adjacent to the first opening, or
a second filter disposed adjacent to the second opening of the first end of the portable shelter.

19. The portable shelter of claim 14, wherein the heat exchanger comprises a first heat exchanger, the portable shelter further comprising a second heat exchanger, and wherein the first heat exchanger and the second heat exchanger are disposed on adjacent sides of the door.

20. The portable shelter of claim 14, wherein:
a first plurality of channels are disposed between the first gap and the second gap of the first subset of panels;
a second plurality of channels are disposed between the first gap and the second gap of the second subset of panels; and
the first plurality of channels and the second plurality of panels share a common wall when the first subset of panels and the second subset of panels are alternatingly stacked.

* * * * *